US012608315B2

(12) United States Patent
Song et al.

(10) Patent No.: US 12,608,315 B2
(45) Date of Patent: Apr. 21, 2026

(54) METHOD FOR CACHING AND MIGRATING DE-COMPRESSED PAGE

(71) Applicant: Rambus Inc., San Jose, CA (US)

(72) Inventors: Taeksang Song, San Jose, CA (US); Christopher Haywood, Fernandina Beach, FL (US); Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/377,597

(22) Filed: Oct. 6, 2023

(65) Prior Publication Data

US 2024/0119001 A1     Apr. 11, 2024

Related U.S. Application Data

(60) Provisional application No. 63/415,014, filed on Oct. 11, 2022.

(51) Int. Cl.
*G06F 12/0802*          (2016.01)

(52) U.S. Cl.
CPC ................................ *G06F 12/0802* (2013.01)

(58) Field of Classification Search
CPC ............. G06F 12/0802; G06F 12/0895; G06F 3/0656; G06F 12/0292; G06F 12/04; G06F 12/0882; G06F 2212/1024; G06F 2212/1044; G06F 2212/401
USPC ........................................................ 711/118
See application file for complete search history.

(56) References Cited

U.S. PATENT DOCUMENTS

| | | | |
|---|---|---|---|
| 7,047,382 B2 | 5/2006 | Geiger et al. | |
| 9,600,420 B2 | 3/2017 | Oportus Valenzuela et al. | |
| 9,652,152 B2 | 5/2017 | Oportus Valenzuela et al. | |
| 10,459,840 B2 | 10/2019 | Kilari et al. | |
| 10,564,871 B2 | 2/2020 | Takeda et al. | |
| 10,802,719 B2 | 10/2020 | Das | |
| 10,970,203 B2 | 4/2021 | Sokol, Jr. | |
| 11,132,300 B2 | 9/2021 | Loh et al. | |
| 2004/0030847 A1* | 2/2004 | Tremaine ................ | G06F 12/08 711/158 |
| 2006/0101223 A1* | 5/2006 | Lekatsas ................. | H03M 7/30 711/E12.017 |

(Continued)

*Primary Examiner* — Jared I Rutz
*Assistant Examiner* — Wei Ma
(74) *Attorney, Agent, or Firm* — Womble Bond Dickinson (US) LLP

(57)          ABSTRACT

Disclosed are techniques for storing data decompressed from the compressed pages of a memory block when servicing data access request from a host device of a memory system to the compressed page data in which the memory block has been compressed into multiple compressed pages. A cache buffer may store the decompressed data for a few compressed pages to save decompression memory space. The memory system may keep track of the number of accesses to the decompressed data in the cache and the number of compressed pages that have been decompressed into the cache to calculate a metric associated with the frequency of access to the compressed pages within the memory block. If the metric does not exceed a threshold, additional compressed pages are decompressed into the cache. Otherwise, all the compressed pages within the memory block are decompressed into a separately allocated memory space to reduce data access latency.

18 Claims, 6 Drawing Sheets

(56) References Cited

U.S. PATENT DOCUMENTS

| | | | |
|---|---|---|---|
| 2006/0206668 A1* | 9/2006 | Uwatoko | G06F 12/0802 |
| | | | 711/E12.017 |
| 2007/0204121 A1* | 8/2007 | O'Connor | G06F 12/128 |
| | | | 711/122 |
| 2017/0004069 A1* | 1/2017 | Li | G06F 12/08 |
| 2018/0095668 A1* | 4/2018 | Malyugin | G06F 3/0604 |
| 2021/0157520 A1 | 5/2021 | Bavishi et al. | |
| 2021/0157736 A1 | 5/2021 | Bavishi et al. | |
| 2022/0206975 A1* | 6/2022 | Gopal | G06F 12/1081 |

* cited by examiner

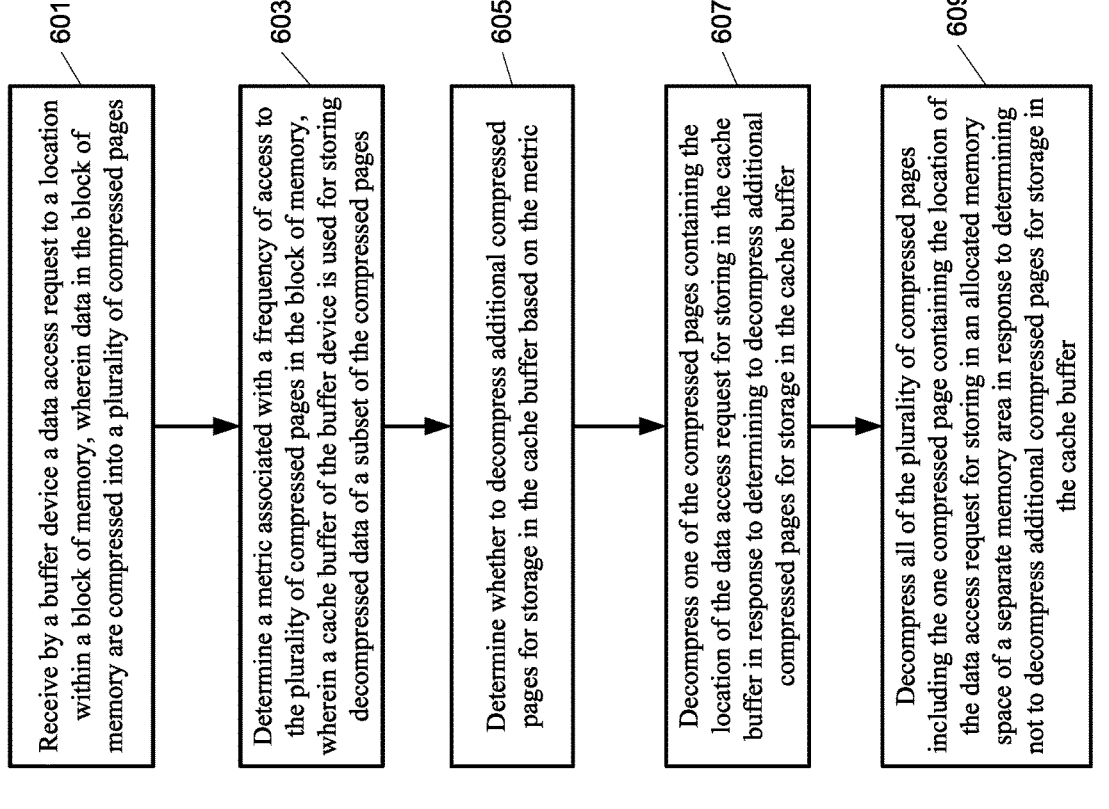

Receive by a buffer device a data access request to a location within a block of memory, wherein data in the block of memory are compressed into a plurality of compressed pages — 601

Determine a metric associated with a frequency of access to the plurality of compressed pages in the block of memory, wherein a cache buffer of the buffer device is used for storing decompressed data of a subset of the compressed pages — 603

Determine whether to decompress additional compressed pages for storage in the cache buffer based on the metric — 605

Decompress one of the compressed pages containing the location of the data access request for storing in the cache buffer in response to determining to decompress additional compressed pages for storage in the cache buffer — 607

Decompress all of the plurality of compressed pages including the one compressed page containing the location of the data access request for storing in an allocated memory space of a separate memory area in response to determining not to decompress additional compressed pages for storage in the cache buffer — 609

METHOD FOR CACHING AND MIGRATING DE-COMPRESSED PAGE

CROSS REFERENCE TO RELATED APPLICATIONS

This application claims the benefit of U.S. Provisional Application No. 63/415,014 filed on Oct. 11, 2022, the disclosure of which is incorporated herein by reference in its entirety.

TECHNICAL FIELD

This disclosure generally relates to technologies for management of memory systems that store data as compressed page data. More specifically, the disclosure relates to systems and methods for accessing compressed page data of memory systems in which a block of memory has been compressed into multiple compressed pages of a smaller size than the size of the memory block.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 illustrates a flow diagram of a method for saving decompressed data of a few compressed pages of a memory block to a cache or storing decompressed data of the entire memory block to a larger allocated memory space allocated as a function of the number of accesses to the compressed pages of the memory block in accordance with one aspect of the present disclosure.

DETAILED DESCRIPTION

Figure 1:
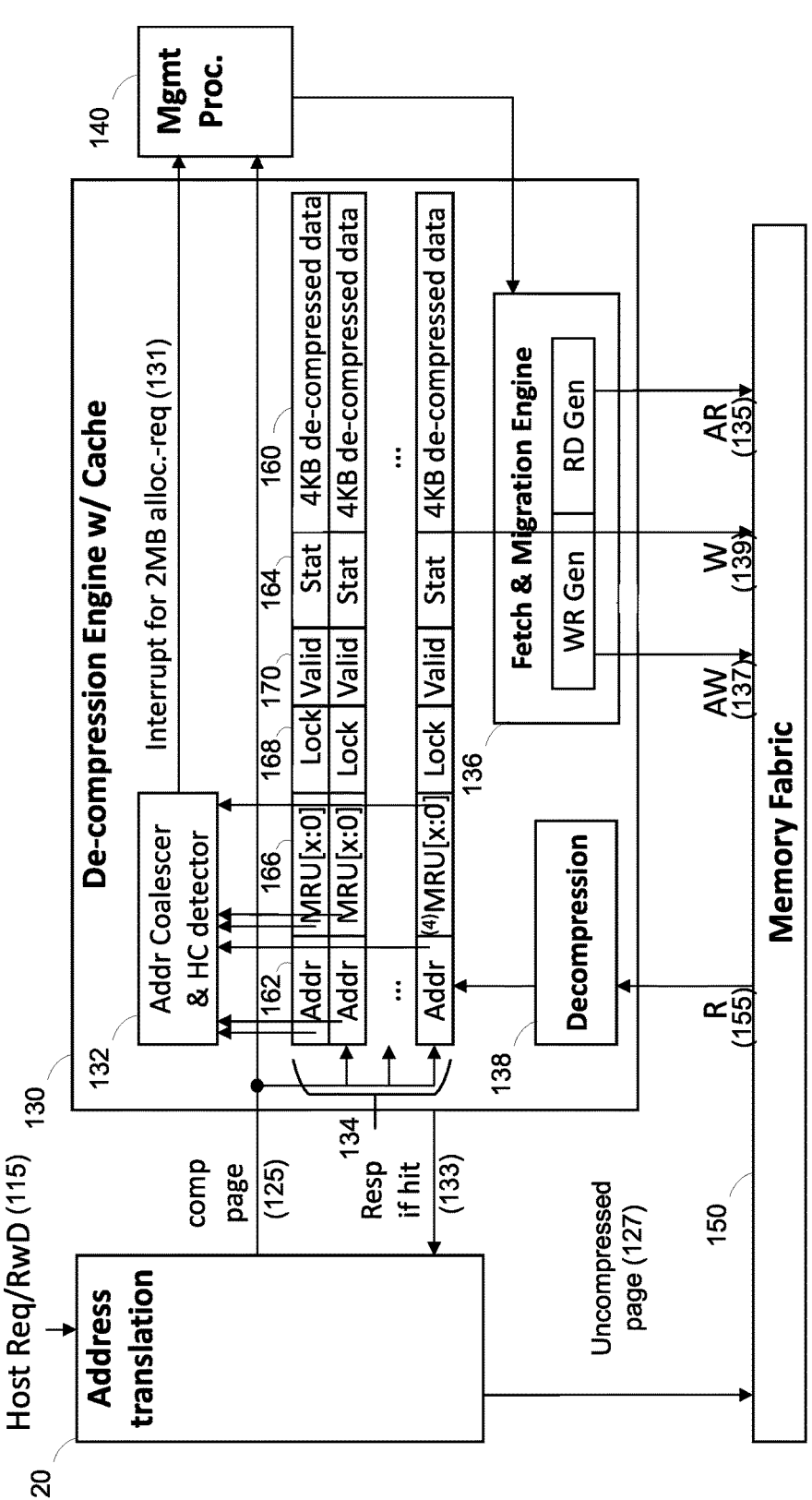
FIG. 1 depicts a cache structure configured to store the decompressed data of a few compressed pages of a memory block instead of using a larger allocated memory space to store the decompressed data of the entire memory block in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

In various embodiments, described is a cache structure and its operation for storing data decompressed from compressed pages of a memory block when servicing read or write access from a host device of a memory system to the compressed page data in which the memory block has been compressed into multiple compressed pages. Memory blocks of a memory system may be assigned or allocated with a minimum granularity. To facilitate the management of memory blocks (also referred to as blocks) and for ease of memory mapping between physical and logical memories, and to reduce the size of block-table lookups, memory blocks are generally allocated with a large granularity (also referred to as allocation granularity). For example, a system with 2 TB of memory may allocate memory blocks with an allocation granularity of 2 MB so as to maintain a 1-level block-table lookup for 1M entries with 8 bytes per each entry for low-latency operation. Speed, size, and bandwidth are important considerations when selecting memory block size in the design of memory systems.

To reduce data access latency, when a host device of the memory system performs a read or a write operation to a location within a block, the memory system may access from a device memory the data stored in a small number of consecutive locations that includes the location requested by the host device. For example, in a read operation, the memory system may return data read from a number of consecutive locations, comprising a cache-line, to the host device. In a write operation, the memory system overwrites the existing cache-line data with new cache-line data, generally consisting of multiple bytes of data. The memory system may write the new cache-line data back to the device memory. In one example, the cache-line may have a granularity of 64B so that 64 consecutive bytes of data are accessed from the memory device.

To efficiently use memory capacity and increase data bandwidth, the memory system may compress the data of an entire block when the block of data has not been accessed in a certain time period so as to free up the memory of the block for other applications. For example, the memory system may compress the entire 2 MB memory range of data for storage in a compressed memory space when the block has been "cold" (not accessed by a host device of the memory system for a minimum time interval). Compression of data in a block may be performed by dividing the block into multiple segments and compressing each segment separately. Compressing a block of data into multiple pages (also referred to as compressed pages) reduces decompression latency when the compressed pages are subsequently decompressed for access by the host device. The design of the size of the segments of the blocks to be compressed is a tradeoff between decompression latency and compression efficiency. For example, the block may be compressed with a compression granularity of 4 KB, smaller than the 2 MB allocation granularity of the block in consideration of the decompression latency, but larger than the 64B cache-line granularity in consideration of a reasonable compression ratio.

In such a scenario, the 2 MB memory space of the block is compressed with a compression granularity of 4 KB into 512 compressed pages, each of which may require less than a page of memory space (e.g., 4 KB) when stored. When the host device accesses a location within the compressed block, the memory system may decompress the compressed pages, for example, by decompressing sequentially the 512 compressed pages into an allocated memory space of 2 MB to enable low data latency in anticipation of the host device accessing multiple compressed pages. The memory system may then read 64B of cache-line data from the decompressed pages in the allocated memory to the host device in a read access or write 64B of new cache-line data to the allocated memory space in a write access.

However, decompressing all the compressed pages within an allocation boundary of a block (e.g., 2 MB block size) may negatively affect data access latency and data bandwidth. For example, because the 2 MB allocation granularity of the block is 512-times the size of the 4 KB compression granularity, if the host device randomly accesses data from multiple compressed 2 MB blocks, there may be serious congestion at the input port of a decompression engine, resulting in long decompression latency. If the host device accesses only a small amount of data in a compressed block just once or infrequently, the 2 MB decompressed block may turn cold again. The memory system may then re-compress the 2 MB block into 512 compressed pages, wasting memory bandwidth and increasing power.

To strike a balance between fast data access and bandwidth efficiency, described are techniques for decompressing a few compressed pages, instead of all the compressed pages, within an allocation boundary when the compressed pages are accessed by a host device. In one embodiment, a decompression engine may decompress only the compressed page accessed by the host device. A cache buffer (or referred to simply as a cache) may store the decompressed data for a few compressed pages. The memory system may keep track of the number of accesses to the decompressed data of each compressed page in the cache and the number of compressed pages that have been decompressed into the cache to calculate a metric associated with the frequency of host access to the compressed pages within the allocation boundary. If the metric exceeds a threshold, the host device is considered to be actively accessing the compressed pages. The memory system may proceed to decompress other compressed pages that have not been accessed or decompress all compressed pages within the allocation boundary into an allocated memory space to reduce data access latency. If the metric does not exceed the threshold and a compressed page whose decompressed data is in the cache turns cold, the memory system may evict the data from the cache if the data has not been modified or writeback the data to the compressed memory space by re-compressing the data if the data has been modified to free up memory space in the cache.

In the example of the 2 MB block allocation granularity and 4 KB compression granularity, the cache may store the 4 KB decompressed data from a number of compressed pages to service data access by the host device to those compressed pages quickly. In one embodiment, when the host device performs a read access to a compressed page, the cache may fetch the compressed page, decompress the compressed page data, and save an address range of the compressed page and the corresponding 4 KB decompressed data in the cache. If the cache-line granularity is 64B, the cache may provide 64B cache-line data from the decompressed data to the host device. When the host device performs a write access to a compressed page, the cache may fetch the compressed page if it's not already in the cache, decompress the compressed page data, overwrite the corresponding 64B cache-line with the write data, and save the address range of the compressed page with the new cache-line data and the remaining unmodified decompressed data in the cache. A dirty bit flag may be set to indicate that the 4 KB decompressed data has been modified from the compressed page data. In one embodiment, the cache may be implemented as a SRAM on the same die as a decompression engine or as a DRAM.

The cache may count the number of accesses to each 4 KB decompressed page data and the number of 4 KB decompressed page data in the cache within the 2 MB block allocation boundary. In one embodiment, the memory system may count the total number of accesses to the compressed pages within the 2 MB block allocation boundary stored in the compressed memory space. A metric may be calculated to measure the level of data access to the 2 MB allocation boundary based on the counts. If the metric exceeds a threshold, indicating the host device is actively accessing data in the 2 MB allocation boundary, the entire 512 compressed pages of the 2 MB allocation boundary may be decompressed and stored in a newly allocated 2 MB memory space to reduce data access latency. For example, if the number of 4 KB decompressed page data within the allocation boundary stored in the cache exceeds a first threshold and the number of accesses to each 4 KB decompressed page data exceeds a second threshold, the memory system may decompress all 512 compressed pages of the 2 MB allocation boundary into a newly allocated 2 MB memory space. For the compressed pages that have been accessed and decompressed into the cache, the memory system may migrate the decompressed page data to the newly allocated 2 MB memory space. For the remaining compressed pages that have not been accessed, the memory access may sequentially decompress the compressed pages into the newly allocated 2 MB memory space. In one embodiment, if an access to a compressed page not already decompressed into the cache triggers the decompression of the entire 512 compressed pages, the memory system may decompress the accessed compressed page first to service the host device before decompressing the other compressed pages.

The memory system may also determine if one or more of the 4 KB decompressed page data have turned "cold" when the decompressed page data has not been accessed within a minimum period of time. The decompressed page data, if it has not been modified, may then be evicted from the cache to free up the cache space for buffering the decompressed data of another compressed page. For example, if a dirty bit flag associated with the 4 KB decompressed page data is not set, then the decompressed page data may simply be evicted from the cache because the compressed page data in the compressed memory space corresponding to the decompressed page is still valid. If the dirty bit flag is set indicating that the decompressed page data has been overwritten by a write operation, the decompressed page data is compressed and written back to the corresponding compressed page of the compressed memory space.

FIG. 1 depicts a cache structure 130 configured to store the decompressed data of a few compressed pages of a memory block instead of using a larger allocated memory space to store the decompressed data of the entire memory block in accordance with one aspect of the present disclosure. A memory fabric 150 may contain various parts of a memory system such as decompressed page data in 2 MB block allocation granularity, compressed data of 2 MB block allocations in 512 compressed pages of 4 KB compression granularity, free page, etc. The memory fabric 150 may be implemented in DRAM to store the code and data of a computer system for access by a host device (e.g., a Central Processing Unit (CPU) of a data server). In one example, the cache structure 130 may be part of a buffer device such as a Compute Express Link (CXL) device used for high-speed CPU-to-memory connection.

Figure 2:
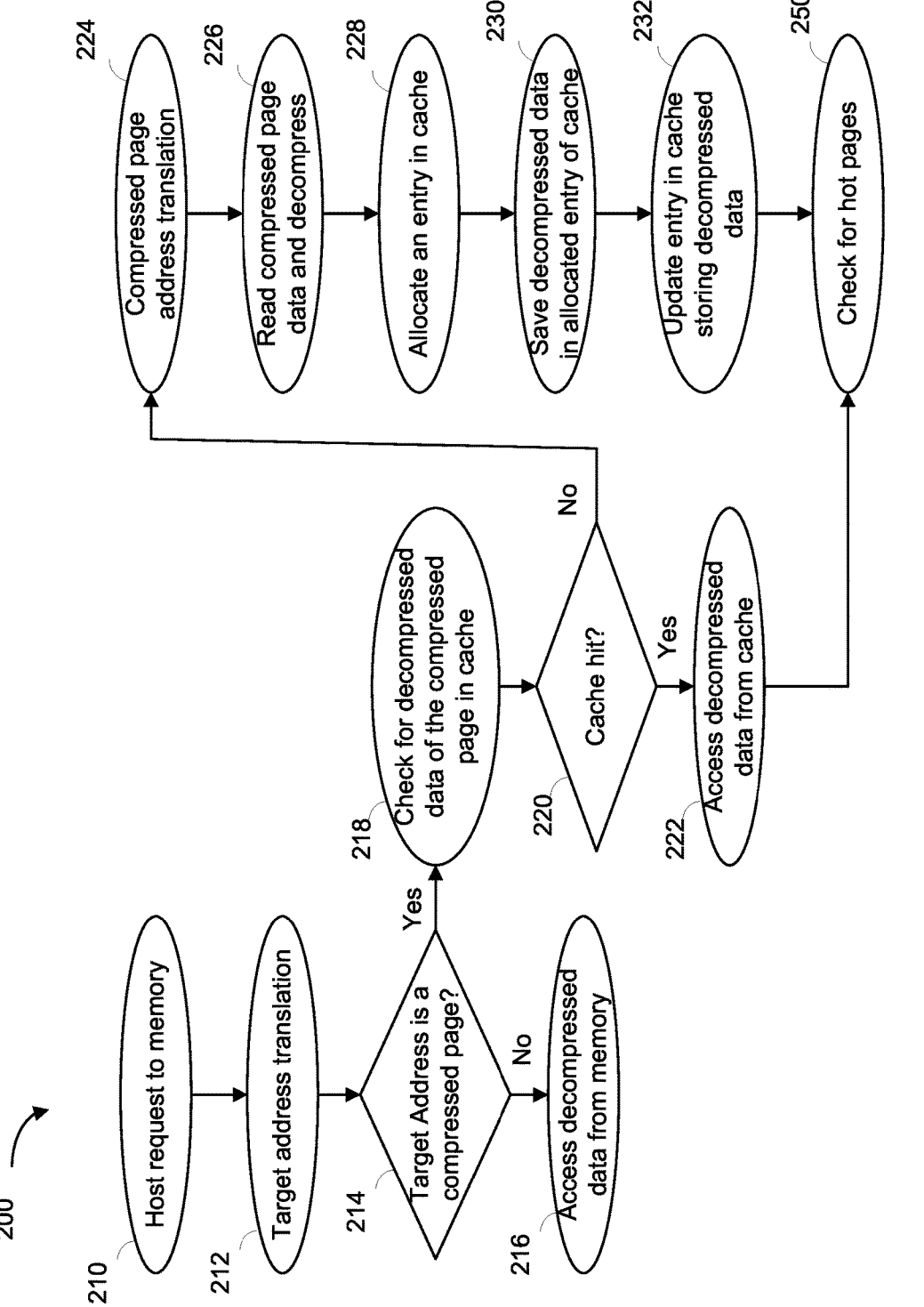
FIG. 2 illustrates a flow diagram of a method for using a cache to store a few decompressed pages of a memory block of a memory system to service memory access requests from a host device when the memory block has been compressed into multiple compressed pages that are smaller in size than the size of the memory block in accordance with one aspect of the present disclosure.

FIG. 2 illustrates a flow diagram of a method 200 for using a cache to store a few decompressed pages of a memory block of a memory system to service memory access requests from a host device when the memory block has been compressed into multiple compressed pages that are smaller in size than the size of the memory block in accordance with one aspect of the present disclosure. In the following, the operation of FIG. 1 and the operation of FIG. 2 will be discussed together.

In operation 210 of FIG. 2, the host device requests an access to the memory system such as a read or write access by providing the target address of the requested access to the memory system. In operation 212, the memory system performs address translation of the requested target address. In operation 214, the memory system determines if the target address is part of a compressed page. If the target address is not part of a compressed page, in operation 216 the memory system accesses the corresponding page of uncompressed data using the target address to service the access request. For example, in a read access, the memory system may read the data of the target address from an uncompressed page of the memory space to return the data to the host device as cache-line read data. In a write operation, the memory system may write the write data received from the host device as new cache-line data into the uncompressed page of the memory space. In a read-modify-write access, the memory system may read the data of the target address from an uncompressed page of the memory space, modify the read data with the write data from the host device, and write back the modified data into the uncompressed page as new cache-line data.

Operations 210-216 may be explained using FIG. 1. For example, the host device may initiate a read or write operation 115 directed toward a target address of the memory fabric 150. An address translation module 120 may determine if the target address is within an uncompressed page or alternatively within a 2 MB block allocation whose data have been compressed. If the target address is within an uncompressed page 127, the address translation module 120 may access the uncompressed page 127 in the memory fabric 150 to perform the requested operation.

Turning back to FIG. 2, if the target address corresponds to a compressed page, in operation 218, the memory system checks to see if the compressed page data has already been decompressed and stored in the cache. The decompressed data may be in the cache (e.g., there is a cache hit in operation 220), if the host device has previously accessed the compressed page and the compressed page has not turned cold. In that case, the memory system in operation 222 accesses the decompressed data in the cache to service the access request. For example, in a read access, the memory system may read the decompressed data of the target address from an entry in the cache corresponding to the compressed page to return the decompressed data to the host device as cache-line read data. In a write operation, the memory system may write the write data received from the host device as new cache-line data into the entry in the cache corresponding to the compressed page. In a read-modify-write access, the memory system may read the decompressed data of the target address from the entry in the cache corresponding to the compressed page, modify the data data with the write data from the host device, and write back the modified data into the entry in the cache as new cache-line data.

If there is not a cache hit for the compressed page, in operation 224, the memory system performs an address translation by looking up the address of the compressed page in the compressed memory space corresponding to the target address. The memory system may use a page look-up-table to translate from the target address to the physical address of the compressed page. In operation 226, the memory system reads and decompresses the compressed page data from the compressed memory using the translated address. In operation 228, the memory system allocates an entry in the cache to receive the decompressed data from the compressed page. In operation 230, the memory system saves the decompressed data in the allocated entry. In operation 232, the memory system updates the allocated entry in the cache with information related to the decompressed data. For example, the entry may contain the address of the compressed page corresponding to the decompressed data, a dirty bit flag indicating that the decompressed data has been modified, information about the number of accesses by the host device to the decompressed data, etc. The decompressed data saved in the cache entry may then be accessed to service the access request by the host device.

In one embodiment, instead of storing the decompressed data in the cache, the memory system may allocate a temporary buffer in a separate memory space to store the decompressed data. The entry in the cache for the compressed page may store the address of the temporary buffer in the memory space holding the decompressed data to reduce the size of the cache. There is an indirect memory addressing scheme with the cache containing an address pointer referencing a separate memory area holding the decompressed data. The temporary buffer in the memory area holding the decompressed data may be referred to as the decompressed cache to distinguish it from the address cache holding the address pointer.

After the decompressed data in the cache is accessed to serve the access request by the host device, in operation 250, the memory system may determine if the host device is actively accessing compressed pages within a block allocation boundary (e.g., if the compressed pages within the block allocation boundary are detected as 'hot pages'). In one embodiment, the memory system may determine a metric based on the number of compressed pages within a block allocation boundary whose decompression data are in the cache and the number of accesses to each compressed page. If the metric exceeds a threshold, the memory system may decompress all the compressed pages within the block allocation boundary into a decompressed memory space allocated to store the decompressed data for the entire block allocation boundary. The memory system may migrate the decompressed data in the cache for those compressed pages that have already been decompressed to the decompressed memory space. In one embodiment, the memory system may fetch and decompress the compressed page data from the compressed memory space for the other compressed pages not in the cache, temporarily store the decompressed data in the cache, and migrate the decompressed data from the cache to the decompressed memory space. Storing the decompressed data of all the compressed pages of the block allocation boundary in the decompressed memory space reduces data access latency when the host device accesses a compressed page, but incurs a cost of increased memory requirement.

Operations 218-232 may be explained using FIG. 1. For example, if the address translation module 120 determines that the target address of the read or write operation from the host device is within a compressed page, the address translation module 120 may generate compressed page information 125 corresponding to the target address. In one embodiment, the compressed page information 125 may include the identity of the block allocation boundary and the identity of the target compressed page corresponding to the target address. A decompression engine with cache 130 may determine if the decompressed data of the target compressed page is in a cache buffer 134 (e.g., a cache hit) based on the compressed page information 125. The cache buffer 134 may have multiple entries to store the decompressed data of multiple compressed pages that have previously been accessed by the host device. If there is a cache hit and the access from the host device is a read operation, the cache buffer 134 may return the cache-line data 133 for the target address from the corresponding entry in the cache buffer 134. In a write operation, the cache may buffer 134 may overwrite the decompressed data for the target address in the corresponding entry of the cache buffer 134 with new cache-line data.

If there is no cache hit, the decompression engine with cache 130 may pass the compressed page information 125 to a memory management processor 140. The memory management processor 140 may perform an address translation to look up the address of the target compressed page in the memory fabric 150 based on the compressed page information 125. The memory management processor 140 may provide the address of the target compressed page to a fetch and migration engine 136. In one embodiment, the decompression engine with cache 130 may perform the address translation to look up the address of the target compressed page without the use of a memory management processor 140. The fetch and migration engine 136 may activate read control 135 to the memory fabric 150 to read the data of the target compressed page corresponding to the target address. A decompression module 138 may decompress the compressed page data 155 returned by the memory fabric 150. The cache buffer 134 may allocate an entry to store the decompressed data 160. The size of the decompressed data 160 may be the compression granularity of 4 KB. The decompressed data 160 may be divided into cache-lines of 64B granularity.

The cache buffer 134 may update the newly allocated entry with an address tag 162 corresponding to the decompressed data 160 of the target compressed page, such as information on the identity of the block allocation boundary and the identity of the compressed page of the decompressed data 160 provided by the compressed page information 125. The address tag 162 may be used for hit detection of future access to the compressed page by the host device. Additional fields in the allocated entry of the cache buffer 134 may include a status bit 164 (e.g., a dirty bit flag) to indicate if the decompressed page data has been modified, a most recently used (MRU) indication 166 (e.g., counter bits) to keep track of the number of accesses or the timing of access to the corresponding compressed page, a lock bit 168 to prevent the decompressed data from being evicted from the cache buffer 134, and a valid bit 170 to indicate that the entry is valid. In one embodiment, the memory management processor 140 may manage the MRU indication 166. An address coalescer and hit-count detector 132 may monitor the address tags 162 and the MRU indication 166 in the entries to determine the number of 4 KB decompressed pages within a 2 MB block allocation boundary in the cache buffer 134 and the number of accesses to each 4 KB decompressed page, respectively. The address coalescer and hit-count detector 132 may determine if the compressed pages of the block allocation boundary are "hot" or "cold." For example, if the number of 4 KB decompressed pages within a 2 MB block allocation boundary in the cache buffer 134 exceeds a first threshold and the number of accesses to each 4 KB decompressed page within the block allocation boundary exceeds a second threshold, the compressed pages of the block allocation boundary are detected as "hot pages." The address coalescer and hit-count detector 132 may generate an interrupt 131 to the memory management processor 140 to allocate decompressed memory space to store the decompressed data for the entire 2 MB block allocation boundary. Other embodiments may use other heuristics to determine if the compressed pages of the block allocation boundary are hot.

When the block allocation boundary is determined to contain hot pages, the memory management processor 140 may activate the fetch and migration engine 136 to read successively the 512 compressed pages of the 2 MB block allocation boundary from the memory fabric 150 if the compressed pages have not previously been decompressed into the cache buffer 134. The decompression module 138 may decompress the compressed page data 155 and the cache buffer 134 may allocate an entry to temporarily store the decompressed data. Regardless of whether the decompressed data of a compressed page is already found in the cache buffer 134 or is newly decompressed from a previously untouched compressed page for temporary storage in the cache buffer 134, the decompressed data may be migrated from the cache buffer 134 to the newly allocated decompressed memory space for the 2 MB block. The fetch and migration engine 136 may activate write control 137 and write data 139 to write the decompressed data for successive compressed pages from the cache buffer 134 to the decompressed memory space in the memory fabric 150 until the decompressed data for all 512 compressed pages of the 2 MB block allocation boundary have been migrated. During data migration, the lock bit 168 may be set in the entry for the corresponding compressed page in the cache buffer 134 to prevent the decompressed data from being otherwise evicted. Upon completion of the data migration, the valid bit 170 for the entry may be changed to indicate that the entry is no longer valid.

The address coalescer and hit-count detector 132 may also determine if one or more of the 4 KB decompressed page data in the cache buffer 134 have turned cold such as when the data has not been accessed within a minimum period of time based on the MRU indication 166. If the dirty bit flag 164 associated with the 4 KB decompressed page data is not set (indicating that the decompressed page data have not been modified) and the lock bit is not set (indicating that the decompressed page data is not being migrated to a decompressed memory space), then the 4 KB decompressed page data may be evicted or erased from the cache buffer 134 to free up the entry in the cache buffer 134. In one embodiment, the decompressed page data may be evicted by setting the valid bit 170 for the entry to indicate the entry is invalid. If the dirty bit flag is set (indicating that the decompressed page data have been modified by a write operation) and the lock bit is not set, the decompressed page data are recompressed and written back to the corresponding compressed page in the memory fabric 150.

Figure 3:
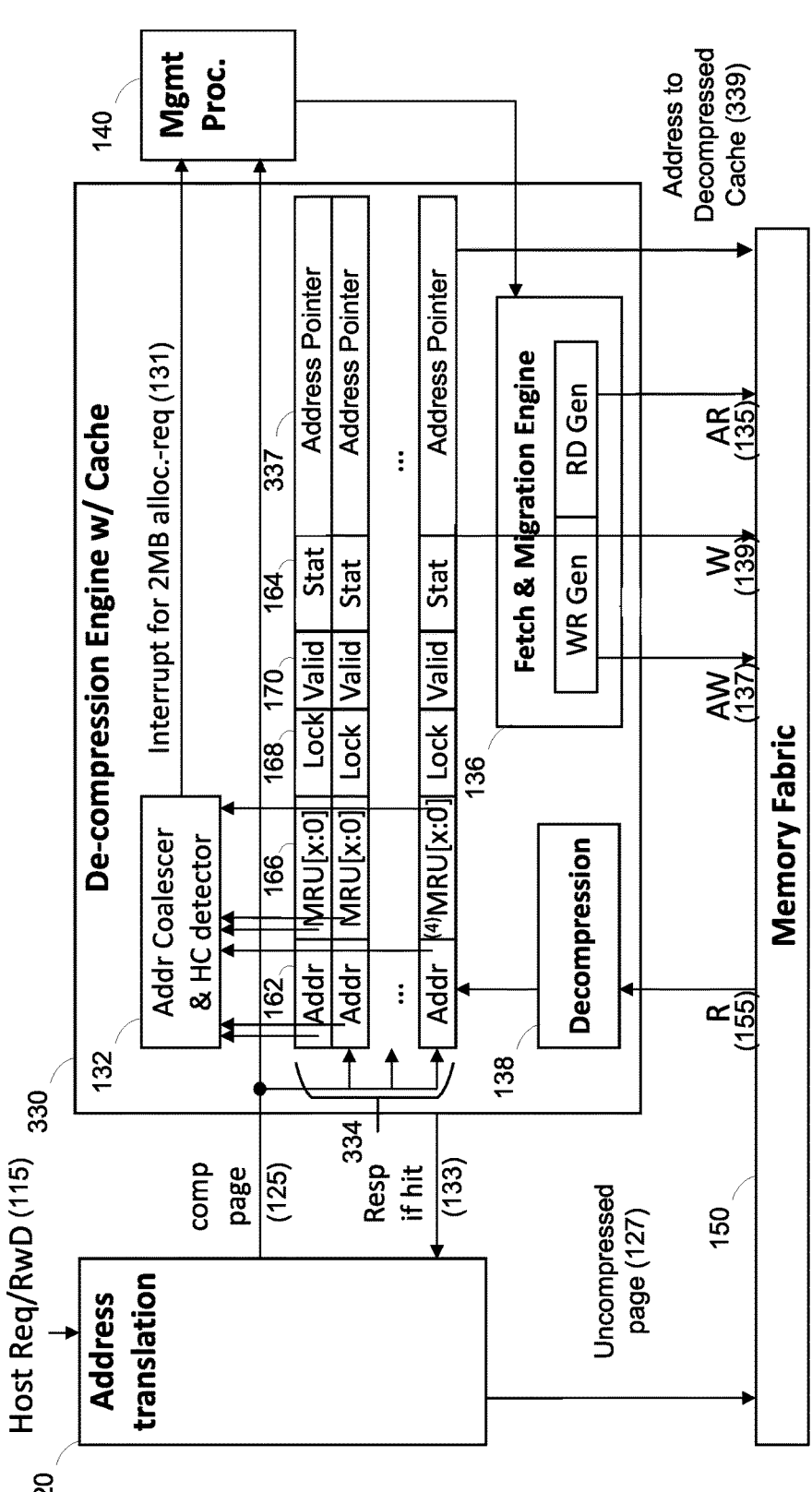
FIG. 3 illustrates a cache structure configured to store the memory pointers used to reference the storage locations of decompressed data for a few compressed pages of a memory block instead of using a larger allocated memory space to store the decompressed data of the entire memory block in accordance with one aspect of the present disclosure.

FIG. 3 illustrates a cache structure 330 configured to store the memory pointers used to reference the storage locations of decompressed data for a few compressed pages of a memory block instead of using a larger allocated memory space to store the decompressed data of the entire memory block in accordance with one aspect of the present disclosure.

The cache buffer 334 in the cache structure 330 of FIG. 3 contains address pointers 337 that point to a separate decompressed cache in the memory fabric 150 holding the 4 KB decompressed data of the multiple compressed pages. For example, each entry of the compressed pages in the cache buffer 334 stores an address pointer 337 referencing a decompressed cache area of the memory fabric 150 holding the decompressed data for the compressed page, instead of storing the decompressed data in the entry as in the cache buffer 134 of FIG. 1. When a memory access by the host device to a compressed page does not result in a cache hit in the cache buffer 334, the memory management processor 140 may allocate a decompressed cache area in the memory fabric 150 to store the decompressed data. The memory management processor 140 may pass to the cache buffer 334 an address pointer 337 to the decompressed cache area. The cache buffer 334 may create an entry to store the address pointer 337 and the other fields such as the address tag 162, MRU indication 166, lock bit 168, valid bit 170, status bit 164 (e.g., dirty bit flag), etc., discussed in FIG. 1.

The memory management processor 140 may provide the address of the target compressed page to the fetch and migration engine 136 to read the compressed page data 155 from the memory fabric 150 as in FIG. 1. The decompression module 138 may decompress the compressed page data 155. In one embodiment, the cache buffer 334 may allocate an entry to temporarily store the decompressed data of the target compressed page. The memory management processor 140 may then activate the fetch and migration engine 136 to write the decompressed page data to the decompressed cache area of the memory fabric 150 using the address pointer 337 from the corresponding compressed page entry in the cache buffer 334. The decompressed page data stored in the temporary buffer of the cache buffer 334 or saved in the decompressed cache area of the memory fabric 150 may be accessed to serve the access request from the host device.

Figure 4:
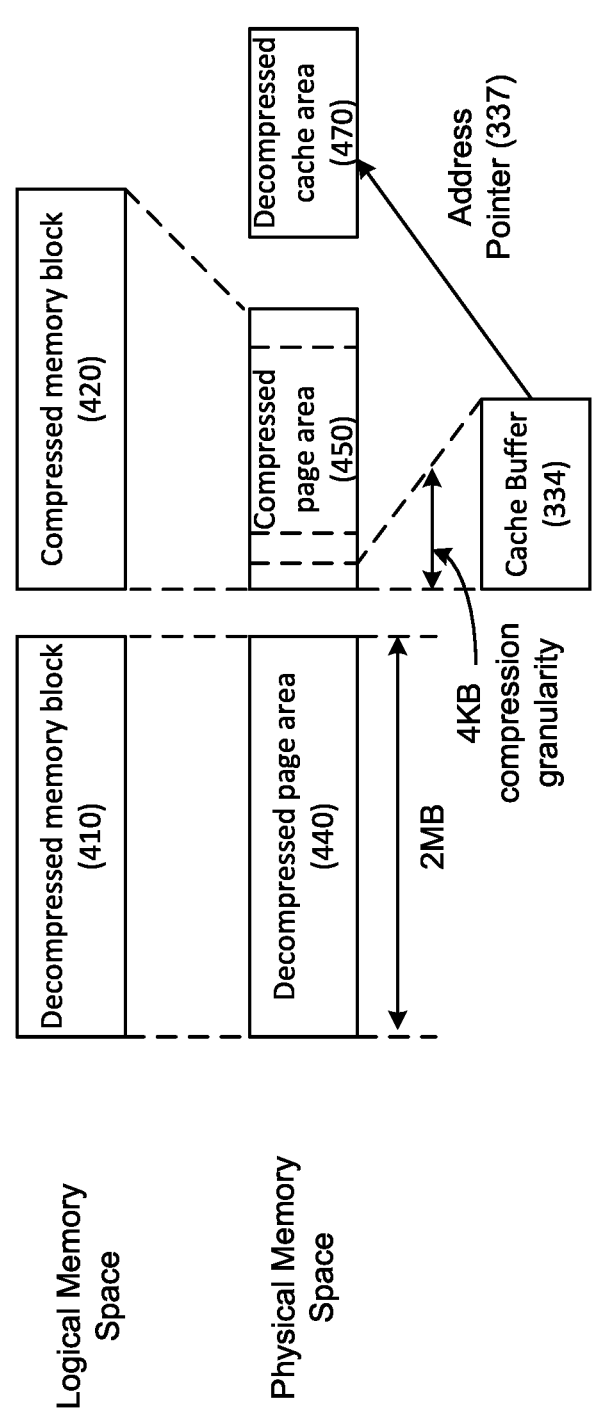
FIG. 4 illustrates a memory organization showing compressed memory blocks, decompressed memory blocks, and temporary decompressed cache area used to store a few decompressed pages of a memory block when the memory organization is used in conjunction with the cache structure of FIG. 3 in accordance with one aspect of the present disclosure.

FIG. 4 illustrates a memory organization showing compressed memory blocks, decompressed memory blocks, and temporary decompressed cache area used to store a few decompressed pages of a memory block when the memory organization is used in conjunction with the cache structure of FIG. 3 in accordance with one aspect of the present disclosure.

A logical memory space may include memory blocks in block allocation granularity of 2 MB, including memory allocations for memory blocks that are decompressed 410 and for memory blocks that are compressed 420. The 2 MB memory allocation for a memory block that is decompressed 410 may map to a decompressed page area 440 of the physical memory space, such as the memory fabric 150 of FIG. 1 or FIG. 3. The decompressed page area 440 may contain the decompressed data for all 512 compressed pages of a 2 MB memory block allocation that have been migrated via a cache buffer when 2 MB memory block allocation detected as containing hot pages due to frequent host device access. The 2 MB memory allocation for a page that is compressed 420 may map to a compressed page area 450 of the physical memory space. The compressed page area 450 stores the compressed data for the 512 compressed pages of the 2 MB memory block allocation in 4 KB compression granularity. The compressed page area 450 may require less memory space than the decompressed page area 440.

A region of the physical memory space may contain memory space for the memory management processor 140 of FIG. 1 or FIG. 3 to allocate the decompressed cache area 470 to hold the decompressed page data of a compressed page from the compressed page area 450. An entry in the cache buffer 334 of FIG. 3 for the compressed page may contain an address pointer such as the address pointer 337 that points to the decompressed cache area 470.

Figure 5:
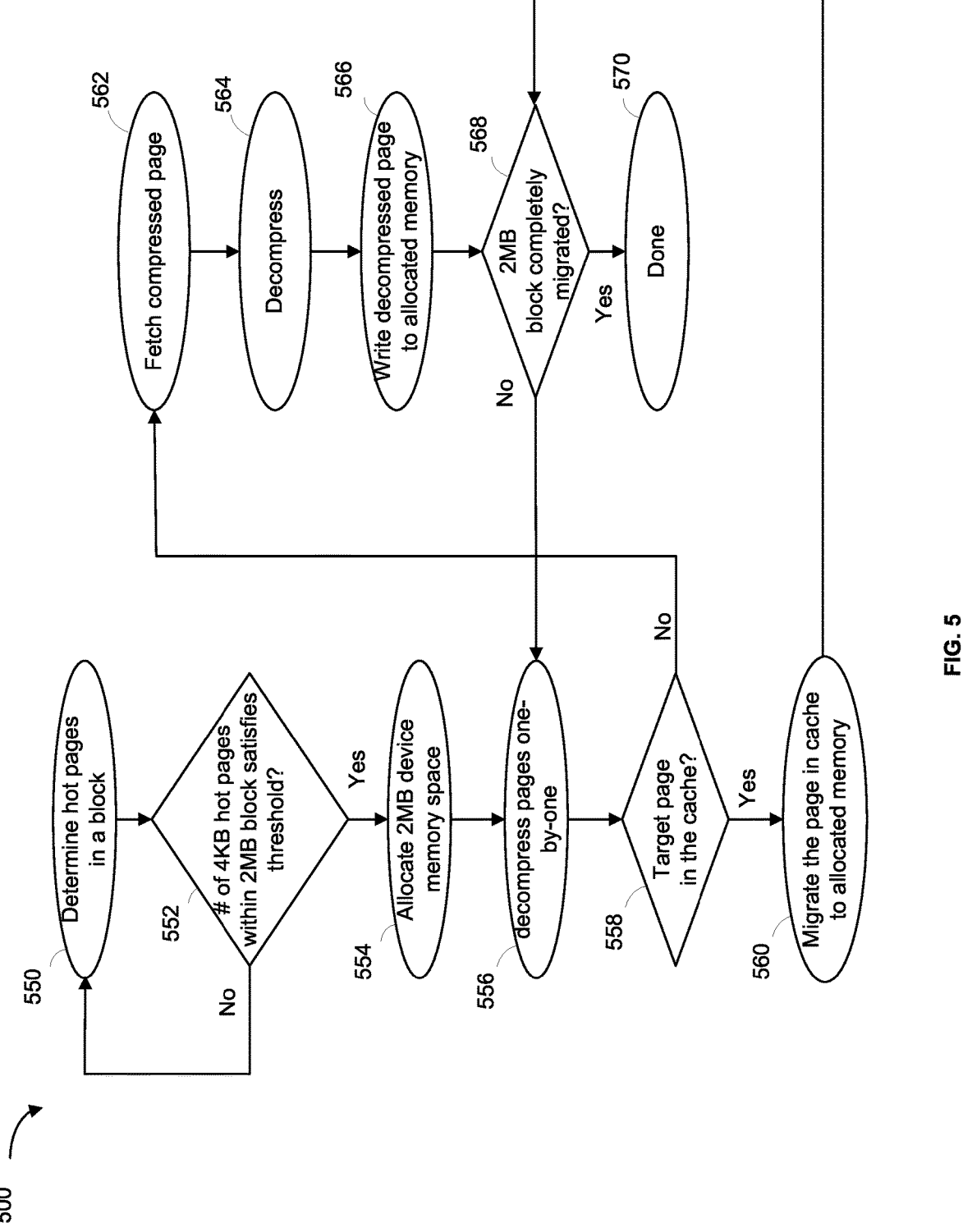
FIG. 5 illustrates a flow diagram of a method for migrating decompressed data from the cache buffer that stores a few decompressed pages of a memory block to a larger memory space allocated to store decompressed data of the entire memory block when the compressed pages of the memory block are considered 'hot pages' (e.g., a number of accesses to the compressed pages exceeds a threshold), in accordance with one aspect of the present disclosure.

FIG. 5 illustrates a flow diagram of a method 500 for migrating decompressed data from the cache buffer that stores a few decompressed pages of a memory block to a larger memory space allocated to store decompressed data of the entire memory block when the compressed pages of the memory block are considered 'hot pages' (e.g., when a number of accesses to the compressed pages exceeds a threshold), in accordance with one aspect of the present disclosure. In one aspect, the method 500 may be performed by the cache structure 130, 330, and the memory management processor 140 of the memory system of FIG. 1 or 3 utilizing hardware, software, or combinations of hardware and software.

In operation 550, the memory system determines if the compressed pages of a block allocation boundary are hot. For example, in operation 552, if the number of 4 KB decompressed pages within a 2 MB block allocation boundary in a cache buffer, such as the cache buffer 134 or 334 in FIG. 1 or FIG. 3, exceeds a first threshold and the number of accesses to each 4 KB decompressed page within the 2 MB block allocation boundary exceeds a second threshold, the compressed pages of the block allocation boundary are detected as hot pages. In that case, in operation 554, a memory management processor 140 allocates decompressed memory space to store the decompressed data for the entire 2 MB block allocation boundary. Otherwise, if the compressed pages of the block allocation boundary are not hot, the memory system returns to operation 550 to continue detecting hot pages.

In operation 556, the memory system decompresses the 512 compressed pages of the 2 MB block allocation boundary page-by-page. In operation 558, the memory system determines if the decompressed data of the target compressed page is already in the cache buffer. If it is, in operation 560, the memory system migrates the decompressed data of the target compressed page from the cache buffer to the allocated decompressed memory space. In operation 568, the memory system checks to determine if all 512 compressed pages of the 2 MB block allocation boundary have been decompressed and migrated to the decompressed memory space. If the data migration is not complete, the memory system return to operation 556 to decompress the next compressed page.

If the decompressed data of the target compressed page is not in the cache buffer as determined from operation 558, in operation 562, the memory system fetches the compressed page data from the compressed memory space, such as the memory fabric 150 of FIG. 1 or FIG. 3. In operation 564, the memory system decompresses the compressed page data. In one embodiment, the memory system may temporarily store the decompressed page data in the cache buffer. In operation 566, the memory system writes the decompressed page data to the allocated decompressed memory space. In operation 568, the memory system checks to determine if all 512 compressed pages of the 2 MB block allocation boundary have been decompressed and migrated to the decompressed memory space. If the data migration is not complete, the memory system return to operation 556 to decompress the next compressed page until the migration of the entire 2 MB block allocation boundary is complete. If all 512 compressed pages have been decompressed and migrated to the decompressed memory space, the method stops at operation 570.

FIG. 6 illustrates a flow diagram of a method 600 for saving decompressed data of a few compressed pages of a memory block to a cache or storing decompressed data of the entire memory block to a larger allocated memory space allocated as a function of the number of accesses to the compressed pages of the memory block in accordance with one aspect of the present disclosure. In one aspect, the method 500 may be performed by the cache structure 130, 330, and the memory management processor 140 of the memory system of FIG. 1 or 3 utilizing hardware, software, or combinations of hardware and software.

In operation 601, a memory system receives a data access request to a location within a block of memory. The data in the block of memory have been compressed into multiple compressed pages to reduce memory usage.

In operation 603, the memory system determines a metric associated with a frequency of access to the plurality of compressed pages in the block of memory, where a cache buffer is used for storing decompressed data of a subset of the compressed pages.

In operation 605, the memory system determines whether to decompress additional compressed pages for storage in the cache buffer based on the metric.

In operation 607, the memory system decompress one of the compressed pages containing the location of the data access request for storing in the cache buffer in response to determining to decompress additional compressed pages for storage in the cache buffer.

In operation 609, the memory system decompress all of the plurality of compressed pages including the compressed page containing the location of the data access request for storing in an allocated memory space of a separate memory area in response to determining not to decompress additional compressed pages for storage in the cache buffer.

Various aspects of the techniques for a memory system to service access requests to compressed page data described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a finite-state-machine (FSM)) may be used in accordance with the teachings described herein, or it may prove convenient to construct more specialized apparatus to perform the required method steps. The required structure for a variety of these systems will appear as set forth in the description above.

In one embodiment, the memory system may include a memory and a processing device. The memory may be synchronous dynamic random access memory (DRAM), read-only memory (ROM)), or other types of memory, which may be configured to store the code to perform the function of the memory system. The processing device may be provided by one or more general-purpose processing devices such as a microprocessor, central processing unit, or the like. In an illustrative example, processing device may comprise a complex instruction set computing (CISC)

microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A buffer device comprising:
a cache buffer configured to store decompressed data of a subset of a plurality of compressed pages of a block of memory, the plurality of compressed pages of the block of memory being stored in a separate memory area; and
a circuit configured to:
receive a data access request to a location with the block of memory;
determine a metric based on a number of the compressed pages whose decompressed data are stored in the cache buffer, wherein the metric is associated with a frequency of access to the plurality of compressed pages;
determine, based on the metric, to decompress additional compressed pages for storage in the cache buffer when the number of the compressed pages whose decompressed data are stored in the cache buffer does not exceed a first threshold;
decompress one of the compressed pages containing the location of the data access request for storing in the cache buffer in response to determining to decompress additional compressed pages for storage in the cache buffer;
decompress all of the plurality of compressed pages including the one compressed page containing the location of the data access request for storing in an allocated memory space of the separate memory area in response to determining not to decompress additional compressed pages for storage in the cache buffer;
determine that a decompressed page dataset, corresponding to a particular compressed page stored in a particular memory space of the block of memory, is overwritten with a different decompressed page dataset;
compress the different decompressed page dataset to generate a different compressed page dataset;
set a lock bit associated with an entry in the cache buffer corresponding to the decompressed data to prevent eviction of the decompressed data during data migration;
perform the data migration by writing the different compressed page dataset to the particular compressed page of the particular memory space;
determine whether the decompressed data has been modified based on a status bit associated with the entry in the cache buffer corresponding to the decompressed data;
clear the decompressed data of one of the subset of compressed pages from the cache buffer based on the metric when the status bit indicates the decompressed data has not been modified and the lock bit is not set; and
set a valid bit associated with the entry in the cache buffer to indicate whether the entry is valid.

2. The buffer device of claim 1, wherein the circuit is further configured to:
receive a second data access request to the subset of the plurality of compressed pages whose decompressed data are stored in the cache buffer; and
service the second data access request using the decompressed data stored in the cache buffer.

3. The buffer device of claim 1, wherein the metric is further determined based on a number of data access requests to the compressed pages whose decompressed data are stored in the cache buffer.

4. The buffer device of claim 3, wherein the circuit determines to decompress additional compressed pages for storage in the cache buffer when the number of data access requests to the compressed pages whose decompressed data are stored in the cache buffer does not exceed a second threshold.

5. The buffer device of claim 1, wherein the circuit is further configured to:
re-compress the decompressed data of one the subset of compressed page into the separate memory area based on the metric.

6. The buffer device of claim 5, wherein the metric indicates there has not been a data access request within a time interval to the one compressed page whose decompressed data is cleared.

7. The buffer device of claim 1, wherein to decompress one of the compressed pages containing the location of the data access request in response to determining to decompress additional compressed pages for storage in the cache buffer, the circuit is configured to:
store decompressed data of the one compressed page containing the location of the data access request in a decompressed cache of the separate memory area; and
store in the cache buffer an address pointer to the decompressed cache.

8. The buffer device of claim 1, wherein to decompress all of the plurality of compressed pages for storing in the allocated memory space, the circuit is configured to:

move the decompressed data of the subset of the plurality of compressed pages stored in the cache buffer to the allocated memory space of the separate memory area.

9. The buffer device of claim 1, wherein the decompressed data of the subset of the plurality of compressed pages stored in the cache buffer are read to service the data access request in a cache-line granularity smaller than a compression granularity of the plurality of compressed pages.

10. A method for memory decompression, comprising:

receiving, by a buffer device, a data access request to a location within a block of memory of a memory system, wherein data in the block of memory are compressed into a plurality of compressed pages;

determining a metric based on a number of the compressed pages whose decompressed data are stored in a cache buffer, wherein the metric is associated with a frequency of access to the plurality of compressed pages, wherein the cache buffer of the buffer device is used to store decompressed data of a subset of the plurality of compressed pages;

determining based on the metric, to decompress additional compressed pages for storage in the cache buffer when the number of the compressed pages whose decompressed data are stored in the cache buffer does not exceed a first threshold;

decompressing one of the compressed pages containing the location of the data access request for storage in the cache buffer in response to determining to decompress additional compressed pages for storage in the cache buffer;

decompressing all of the plurality of compressed pages including the one compressed page containing the location of the data access request for storage in an allocated memory space of the memory system in response to determining not to decompress additional compressed pages for storage in the cache buffer;

determining that a decompressed page dataset, corresponding to a particular compressed page stored in a particular memory space of the block of memory, is overwritten with a different decompressed page dataset;

compressing the different decompressed page dataset to generate a different compressed page dataset;

setting a lock bit associated with an entry in the cache buffer corresponding to the decompressed data to prevent eviction of the decompressed data during data migration;

performing the data migration by writing the different compressed page dataset to the particular compressed page of the particular memory space;

determining whether the decompressed data has been modified based on a status bit associated with the entry in the cache buffer corresponding to the decompressed data;

clearing the decompressed data of one of the subset of compressed pages from the cache buffer based on the metric when the status bit indicates the decompressed data has not been modified and the lock bit is not set; and setting a valid bit associated with the entry in the cache buffer to indicate whether the entry is valid.

11. The method of claim 10, further comprising:

receiving, by the buffer device, a second data access request to the subset of the plurality of compressed pages whose decompressed data are stored in the cache buffer; and servicing the second data access request using the decompressed data stored in the cache buffer.

12. The method of claim 10, wherein the metric is further determined based on a number of data access requests to the compressed pages whose decompressed data are stored in the cache buffer.

13. The method of claim 12, wherein determining whether to decompress additional compressed pages for storage in the cache buffer comprises:

determining to decompress additional compressed pages for storage in the cache buffer when the number of data access requests to the compressed pages whose decompressed data are stored in the cache buffer does not exceed a second threshold.

14. The method of claim 10, further comprising:

re-compressing the decompressed data of one the subset of compressed page into the memory system based on the metric.

15. The method of claim 14, wherein the metric indicates there has not been a data access request within a time interval to the one compressed page whose decompressed data is cleared.

16. The method of claim 10, wherein decompressing one of the compressed pages containing the location of the data access request for storage in the cache buffer comprises:

storing decompressed data of the one compressed page containing the location of the data access request in a decompressed cache of the memory system; and storing in the cache buffer an address pointer to the decompressed cache.

17. The method of claim 10, wherein decompressing all of the plurality of compressed pages for storage in the allocated memory space of the memory system comprises:

moving the decompressed data of the subset of the plurality of compressed pages stored in the cache buffer to the allocated memory space of the memory system.

18. A non-transitory computer-readable medium having instructions stored therein, which when executed by a processor, cause the processor to perform operations, the operations comprising:

receiving a data access request to a location within a block of memory of a memory system, wherein data in the block of memory are compressed into a plurality of compressed pages;

determining a metric based on a number of the compressed pages whose decompressed data are stored in a cache buffer, wherein the metric is associated with a frequency of access to the plurality of compressed pages, wherein the cache buffer is used to store decompressed data of a subset of the plurality of compressed pages;

determining, based on the metric, to decompress additional compressed pages for storage in the cache buffer when the number of the compressed pages whose decompressed data are stored in the cache buffer does not exceed a first threshold;

decompressing one of the compressed pages containing the location of the data access request for storage in the cache buffer in response to determining to decompress additional compressed pages for storage in the cache buffer;

decompressing all of the plurality of compressed pages including the one compressed page containing the location of the data access request for storage in an allocated memory space of the memory system in response to determining not to decompress additional compressed pages for storage in the cache buffer;

determining that a decompressed page dataset, corresponding to a particular compressed page stored in a particular memory space of the block of memory, is overwritten with a different decompressed page dataset;

compressing the different decompressed page dataset to generate a different compressed page dataset;

setting a lock bit associated with an entry in the cache buffer corresponding to the decompressed data to prevent eviction of the decompressed data during data migration;

performing the data migration by writing the different compressed page dataset to the particular compressed page of the particular memory space;

determining whether the decompressed data has been modified based on a status bit associated with the entry in the cache buffer corresponding to the decompressed data;

clearing the decompressed data of one of the subset of compressed pages from the cache buffer based on the metric when the status bit indicates the decompressed data has not been modified and the lock bit is not set; and setting a valid bit associated with the entry in the cache buffer to indicate whether the entry is valid.

\* \* \* \* \*